(12) United States Patent
Blakeley et al.

(10) Patent No.: US 10,388,969 B2
(45) Date of Patent: Aug. 20, 2019

(54) BIPOLAR PLATE FOR A FUEL CELL, AND A METHOD MANUFACTURING THE SAME

(71) Applicant: GM GLOBAL TECHNOLOGY OPERATIONS LLC, Detroit, MI (US)

(72) Inventors: Richard D. Blakeley, Ortonville, MI (US); Xi Yang, Bloomfield Hills, MI (US); Siguang Xu, Rochester Hills, MI (US); Liang Xi, Madison Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 316 days.

(21) Appl. No.: 15/298,273

(22) Filed: Oct. 20, 2016

(65) Prior Publication Data

US 2018/0114994 A1    Apr. 26, 2018

(51) Int. Cl.
*H01M 8/0297*  (2016.01)
*H01M 8/0206*  (2016.01)
*H01M 8/0267*  (2016.01)

(52) U.S. Cl.
CPC ....... *H01M 8/0297* (2013.01); *H01M 8/0206* (2013.01); *H01M 8/0267* (2013.01); *Y02P 70/56* (2015.11)

(58) Field of Classification Search
None
See application file for complete search history.

(56) References Cited

U.S. PATENT DOCUMENTS

| 8,371,587 | B2 | 2/2013 | Fly et al. |
| 8,603,704 | B2 | 12/2013 | Keyser et al. |
| 2006/0054664 | A1* | 3/2006 | Strobel ............... H01M 8/0206 228/179.1 |

* cited by examiner

*Primary Examiner* — Carmen V Lyles-Irving
(74) *Attorney, Agent, or Firm* — Quinn IP Law

(57) ABSTRACT

A bipolar plate for a fuel cell includes a first plate having a first bead seal, and a second plate having a second bead seal. The first bead seal and the second bead seal are disposed opposite each other and extend along a centerline. An outer weld connects the first plate and the second plate together, and extends along an outer weld line. The outer weld line is laterally spaced an outer gap distance from an outer lateral edge of the first and second bead seals. The outer gap distance varies with a position along the centerline to control a stiffness of the bead seals. Positioning the weld line nearer the outer lateral edge increases the stiffness of the raised bead seals in low stiffness areas, whereas positioning the weld line farther from the lateral edge decreases the stiffness of the raised bead seals in high stiffness areas.

10 Claims, 3 Drawing Sheets

BIPOLAR PLATE FOR A FUEL CELL, AND A METHOD MANUFACTURING THE SAME

INTRODUCTION

The disclosure generally relates to a bipolar plate having a bead seal for sealing against an adjacent plate, and a method of manufacturing the same.

Fuel cells are electrochemical devices which combine a fuel such as hydrogen and an oxidant such as oxygen to produce electricity. The term "fuel cell" is typically used to refer to either a single cell or a plurality of cells depending upon the context in which it is used. The plurality of cells is typically bundled together and arranged to form a stack with the plurality of cells commonly arranged in electrical series.

Different fuel cell types can be provided such as phosphoric acid, alkaline, molten carbonate, solid oxide, and proton exchange membrane (PEM), for example. The basic components of a PEM-type fuel cell are two electrodes separated by a polymer membrane electrolyte. Each electrode is coated on one side with a thin catalyst layer. The electrodes, catalyst, and membrane together form a membrane electrode assembly (MEA).

In a typical PEM-type fuel cell, the MEA is sandwiched between "anode" and "cathode" diffusion mediums (hereinafter "DM's") or diffusion layers that are formed from a resilient, conductive, and gas permeable material such as carbon fabric or paper. The DM's serve as the primary current collectors for the anode and cathode as well as provide mechanical support for the MEA. The DM's and MEA are pressed between a pair of electronically conductive plates e.g., bipolar plates, which serve as secondary current collectors for collecting the current from the primary current collectors.

The bipolar plates typically include two thin, facing metal sheets. One of the sheets defines a flow path on one outer surface thereof for delivery of the fuel to the anode of the MEA. An outer surface of the other sheet defines a flow path for the oxidant for delivery to the cathode side of the MEA. When the sheets are joined, the joined surfaces may define a flow path for a dielectric cooling fluid. The plates are typically produced from a formable metal that provides suitable strength, electrical conductivity, and corrosion resistance.

In order to mitigate against undesirable leakage of fluids from between the pairs of plates, a seal is often used. The seal is disposed along a peripheral edge of the pairs of plates, and/or around a periphery of an aperture extending through the plates. The seal may include an elastomeric seal, or alternatively, the metal plates may be formed to define a raised bead seal. The raised bead seal may be formed on a planar metal sheet adjacent an outer edge of the sheet, or adjacent an edge surrounding an aperture formed in the sheet. The raised bead seal may be formed in the metal sheet by a stamping operation, although other methods may be used. The raised bead seal may be substantially symmetrical about a longitudinal center line of the raised bead seal. However, it should be appreciated that the raised bead seal may be non-symmetrical about the longitudinal center line. The raised bead seal may include a generally arcuate cross sectional shape perpendicular to the longitudinal center line. The generally arcuate cross sectional shape of the raised bead seal provides an elastic response to a load in a direction normal to the planar metal sheet.

The raised bead seal is compressed against an adjoining plate to form a seal against the adjoining plate. If portions of the raised bead seal have a high stiffness, and others have a lower stiffness, the high stiffness areas of the raised bead seal may prevent the lower stiffness areas of the raised bead seal from forming a tight seal. Accordingly, the raised bead seals should have a uniform stiffness in all sections of the raised bead seal in order to form a tight seal around the entire peripheral edge of the plates and/or around the entire periphery of the adjacent aperture.

SUMMARY

A method of manufacturing a bipolar plate for a fuel cell is provided. The method includes forming a first plate to include a first bead seal extending along a centerline. The first bead seal includes a first inner lateral edge and a first outer lateral edge. The first plate is positioned against a second plate. The first plate is welded to the second plate along an outer weld line. The outer weld line is laterally spaced from the first outer lateral edge an outer gap distance. The outer gap distance varies with a position along the centerline to control a stiffness of the first bead seal.

In one aspect of the method, the outer weld line is positioned relative to the first outer lateral edge to define a first value for the outer gap distance in a first region of the first bead seal to provide a first stiffness. In another aspect of the method, the outer weld line is positioned relative to the first outer lateral edge to define a second value for the outer gap distance in a second region of the first bead seal to provide a second stiffness. The first value of the outer gap distance is less than the second value of the outer gap distance, with the first stiffness being substantially equal to the second stiffness.

In another aspect of the method, forming the first plate to include the first bead seal includes forming the first bead seal to define an endless loop having at least one corner section and at least one substantially linear section, with the first region being the at least one substantially linear section of the first bead seal, and the second region being the at least one corner section of the first bead seal.

In another aspect of the method, the outer weld line is positioned nearer to the first outer lateral edge to decrease the outer gap distance and increase the stiffness of the first bead seal in a first region to achieve a first stiffness of the first bead seal. In another aspect of the method, the outer weld line is positioned farther from the first outer lateral edge to increase the outer gap distance and decrease the stiffness of the first bead seal in a second region to achieve a second stiffness of the first bead seal, with the first stiffness being substantially equal to the second stiffness.

In another aspect of the method, the second plate is formed to include a second bead seal extending along the centerline, and having a second inner lateral edge and a second outer lateral edge. In another aspect of the method, positioning the first plate against the second plate includes positioning the first plate against the second plate such that the first bead seal and the second bead seal are disposed opposite each other and extend away from each other to form a channel therebetween. The first inner lateral edge and the second inner lateral edge are aligned with each other, and the first outer lateral edge and the second outer lateral edge are aligned with each other.

In another aspect of the method, the first plate is welded to the second plate along an inner weld line. The inner weld line is laterally spaced from the first inner lateral edge an inner gap distance. The inner gap distance varies with movement along the centerline to control the stiffness of the first bead seal. In another aspect of the method, the inner gap distance and the outer gap distance are substantially equal to each other at any location along the centerline.

A method of manufacturing a bipolar plate for a fuel cell is also provided. The method includes forming a first plate to include a first bead seal that extends along a centerline, and has a first inner lateral edge and a first outer lateral edge. A second plate is formed to include a second bead seal that extends along the centerline, and has a second inner lateral edge and a second outer lateral edge. The first plate is positioned against the second plate, such that the first bead seal and the second bead seal are disposed opposite each other and extend away from each other to form a channel therebetween. The first inner lateral edge and the second inner lateral edge are aligned with each other, and the first outer lateral edge and the second outer lateral edge are aligned with each other. The first plate is welded to the second plate along an outer weld line. The outer weld line is laterally spaced from the first outer lateral edge and the second outer lateral edge an outer gap distance. The outer gap distance varies with a position along the centerline to control a stiffness of the first bead seal and the second bead seal.

In one aspect of the method, the outer weld line is positioned relative to the first outer lateral edge and the second outer lateral edge to define a first value for the outer gap distance in a substantially linear section of the first bead seal to provide a first stiffness. In another aspect of the method, the outer weld line is positioned relative to the first outer lateral edge and the second outer lateral edge to define a second value for the outer gap distance in a corner section of the first bead seal to provide a second stiffness. The first value of the outer gap distance is less than the second value of the outer gap distance, with the first stiffness being substantially equal to the second stiffness.

In another aspect of the method, the first plate is welded to the second plate along an inner weld line. The inner weld line is laterally spaced from the first inner lateral edge and the second inner lateral edge an inner gap distance. The inner gap distance varies with movement along the centerline to control the stiffness of the first bead seal and the second bead seal.

A bipolar plate for a fuel cell is also provided. The bipolar plate includes a first plate having a first bead seal formed therein. The first bead seal extends along a centerline, and has a first inner lateral edge and a first outer lateral edge. A second plate is positioned against the first plate. An outer weld connects the first plate and the second plate together, and extends along an outer weld line. The outer weld line is laterally spaced from the first outer lateral edge an outer gap distance along the centerline. The outer gap distance varies with a position along the centerline to control a stiffness of the first bead seal.

In one aspect of the bipolar plate, the second plate includes a second bead seal formed therein. The second bead seal extends along the centerline, and has a second inner lateral edge and a second outer lateral edge. The first inner lateral edge and the second inner lateral edge are aligned with each other, and the first outer lateral edge and the second outer lateral edge are aligned with each other.

In another aspect of the bipolar plate, an inner weld connects the first plate and the second plate together, and extends along an inner weld line. The inner weld line is laterally spaced from the first inner lateral edge an inner gap distance along the centerline. The inner gap distance varies with position along the centerline to control the stiffness of the first bead seal.

In another aspect of the bipolar plate, the first bead seal includes a first region extending along the centerline, with the gap distance within the first region substantially equal to a first value to achieve a first stiffness of the first bead seal. In another aspect of the bipolar plate, the first bead seal includes a second region extending along the centerline, with the gap distance within the second region substantially equal to a second value to achieve a second stiffness of the first bead seal. The first stiffness and the second stiffness are approximately equal to each other. In another aspect of the bipolar plate, the first region is a substantially linear section of the first bead seal, and the second region is a corner section of the first bead seal, with the first value of the gap distance being less than the second value of the gap distance.

Accordingly, the location or distance of the weld line relative to the outer lateral edge of the raised bead seal is controlled and varied to control the stiffness of the raised bead seal. By doing so, the stiffness of the raised bead seal may be controlled to be generally uniform through all sections of the raised bead seals, thereby providing a tight seal through all sections of the raised bead seals.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the FIGS., and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the FIGS., wherein like numerals indicate like parts throughout the several views, a bipolar plate is generally shown at 20. The bipolar plate 20 is configured for use in a fuel cell, or fuel cell stack, as is known in the art. The specifics of the fuel cell are not pertinent to the teachings of this disclosure, and are therefore not described in detail herein.

Figure 1:
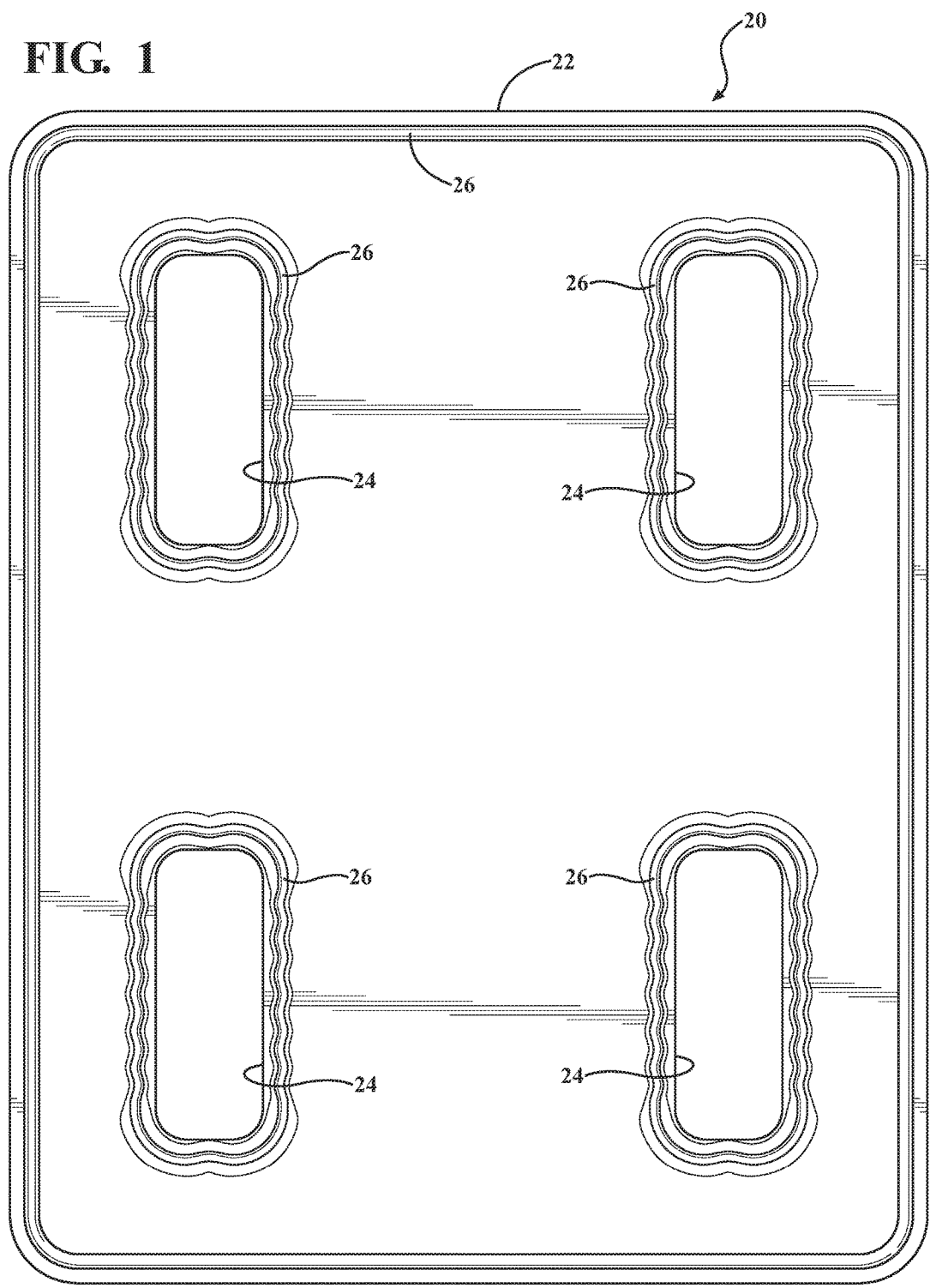
FIG. 1 is a schematic plan view of a bipolar plate for a fuel cell stack.

Referring to FIG. 1, the bipolar plate 20 includes an outer peripheral edge 22, and defines a plurality of apertures 24 extending through the bipolar plate 20. A raised bead seal 26 is disposed adjacent the outer peripheral edge 22 of the bipolar plate 20, as well as adjacent a periphery of each of the apertures 24. The raised bead seals 26 shown in FIG. 1 are described in greater detail below, with reference to FIGS. 2 and 3. While the detailed description below only references a single raised bead seal 26, it should be appreciated that the detailed description below and the exemplary embodiment shown in FIGS. 2 and 3 apply to all of the raised bead seals 26 shown in FIG. 1.

Figure 2:
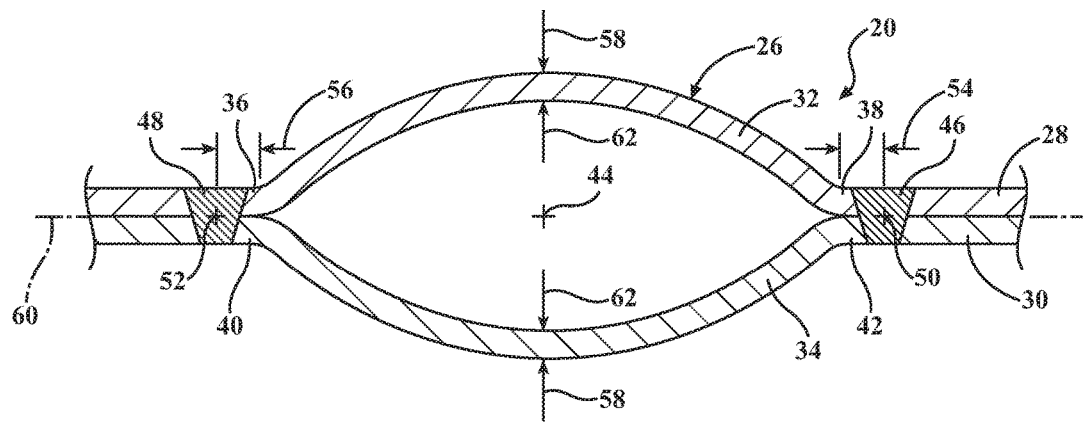
FIG. 2 is a schematic fragmentary cross sectional view of the bipolar plate showing a cross section of the raised bead seal.
Figure 4:
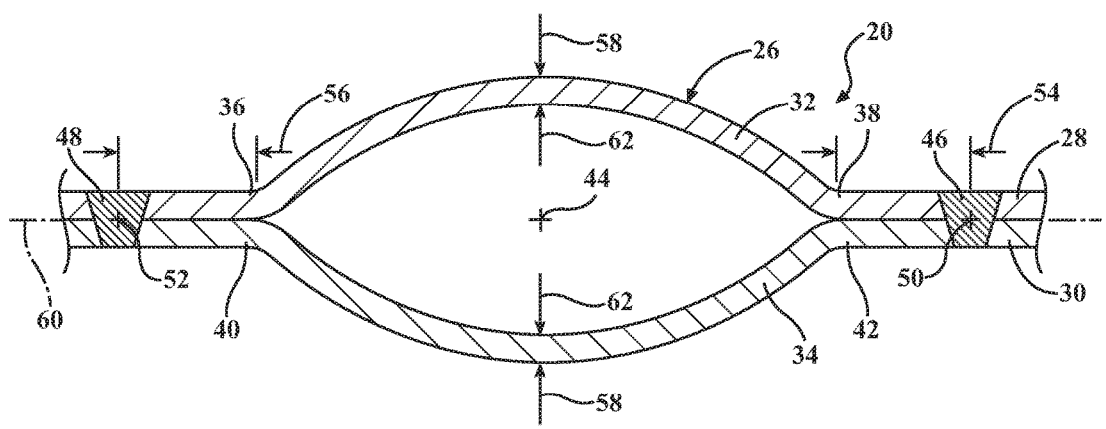
FIG. 4 is a schematic fragmentary cross sectional view of the bipolar plate showing a cross section of the raised bead seal.

Referring to FIGS. 2 and 4, the bipolar plate 20 includes an anode plate, hereinafter referred to as the first plate 28, and a cathode plate, hereinafter referred to as the second plate 30. The first plate 28 and the second plate 30 are positioned flat against each other. Each of the first plate 28 and the second plate 30 include generally planar plates. As shown in FIGS. 2 and 4, the first plate 28 includes a first bead seal 32 formed therein, and the second plate 30 includes a second bead seal 34 formed therein. The first bead seal 32 and the second bead seal 34 are disposed opposite each other, and extend away from each other, out of the planes of the first plate 28 and the second plate 30 respectively. The first bead seal 32 and the second bead seal 34 cooperate to form the raised bead seal 26. While the exemplary embodiment shown in the FIGS. and described herein includes both the first plate 28 and the second plate 30 having a bead seal, i.e., the first bead seal 32 and the second bead seal 34 respectively, it should be appreciated that the teachings of this disclosure may be applied to a bipolar plate 20 in which only one of the plates has a bead seal formed therein.

The first bead seal 32 includes a first inner lateral edge 36, and a first outer lateral edge 38. The second bead seal 34 includes a second inner lateral edge 40, and a second outer lateral edge 42. The first inner lateral edge 36 and the second inner lateral edge 40 are generally aligned with and disposed opposite each other. Similarly, the first outer lateral edge 38 and the second outer lateral edge 42 are generally aligned with and disposed opposite each other.

Figure 3:
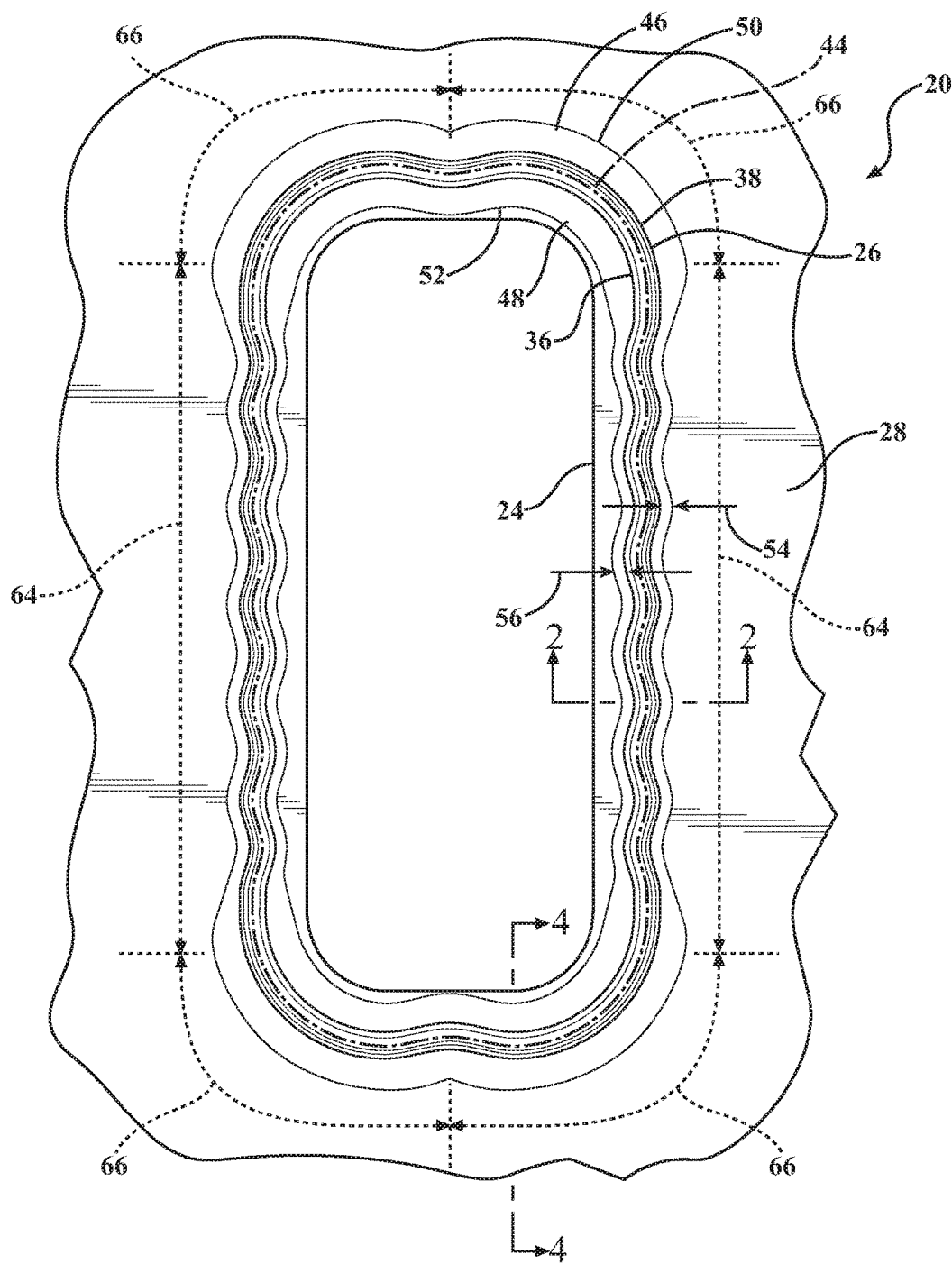
FIG. 3 is a schematic fragmentary plan view of the bipolar plate showing a raised bead seal around an aperture in the bipolar plate.

Referring to FIG. 3, the first bead seal 32 extends along a centerline 44. While not explicitly shown in FIG. 3, it should be appreciated that the second bead seal 34 also extends along the centerline 44.

The first bead seal 32 and/or the second bead seal 34 may be formed in the first plate or the second plate respectively by a stamping operation, although other methods may be used. The raised bead seal 26 may be substantially symmetrical about the longitudinal centerline 44 of the raised bead seal 26. However, it should be appreciated that the raised bead seal 26 may be non-symmetrical about the longitudinal centerline 44. The each of the first bead seal 32 and the second bead seal 34 may include a generally arcuate cross sectional shape perpendicular to the longitudinal centerline 44, such that the raised bead seal 26 includes a generally elliptical cross sectional shape perpendicular to the longitudinal centerline 44. The generally arcuate cross sectional shape of the first bead seal 32 and the second bead seal 34 provides an elastic response to a load in a direction normal to the bipolar plate 20. The raised bead seal 26, including both the first bead seal 32 and the second bead seal 34 may include any desirable cross sectional shape.

The first plate 28 and the second plate 30 are welded together. As shown in FIG. 3, the bipolar plate 20 includes an outer weld 46 and an inner weld 48 connecting the first plate 28 and the second plate 30 together. The outer weld 46 extends along an outer weld line 50. The inner weld 48 extends along an inner weld line 52. While FIG. 3 shows the bipolar plate 20 including both the inner weld 48 and the outer weld 46, it should be appreciated that the bipolar plate 20 may only include one of the inner weld 48 or the outer weld 46, depending upon the relative position of the raised bead seal 26 to the aperture 24 or edge of the bipolar plate 20 to which it is sealing around. As shown in FIG. 3, for example, the bipolar plate 20 may include only the outer weld line 50, and may not include the inner weld line 52.

The outer weld line 50 is laterally spaced from the first outer lateral edge 38 and the second outer lateral edge 42 an outer gap distance 54 along the centerline 44. The outer gap distance 54 varies with a position along the centerline 44. The inner weld line 52 is laterally spaced from the first inner lateral edge 36 and the second inner lateral edge 40 an inner gap distance 56 along the centerline 44. The inner gap distance 56 varies with a position along the centerline 44. The outer gap distance 54 and the inner gap distance 56 are varied with their position along the centerline 44 in order to control a stiffness of the first bead seal 32 and the second bead seal 34. As used herein, the term "stiffness" may be defined as the extent or amount of resistance against deformation in response to an applied force 58 (shown in FIGS. 2 and 4) directed normal to a datum plane 60 of the first plate 28 and the second plate 30.

In order to achieve a good seal, the raised bead seal 26 must respond to the applied force 58 by providing a resultant seal force 62 (shown in FIGS. 2 and 4) that is uniformly distributed along the entire length of the raised bead seal 26. If one section of the raised bead seal 26 has a higher stiffness than another section of the raised bead seal 26, then the higher stiffness section of the raised bead seal 26 will provide a higher seal force, while the lower stiffness section of the raised bead seal 26 will provide a lower seal force. Accordingly, it is important to make the stiffness of the raised bead seal 26 uniform along the entire length of the raised bead seal 26, in order to provide a consistent seal force along the entire length of the raised bead seal 26.

Referring to FIGS. 2 and 4, the inner gap distance 56 and the outer gap distance 54 may be varied in order to control the stiffness of the raised bed seal, including the first bed seal and the second bed seal. As shown in FIG. 4, by positioning the inner weld line 52 and the outer weld line 50 farther from the lateral edges of the raised bead seal 26, thereby increasing the gap distance, the stiffness of the raised bead seal 26 is decreased. In contrast, as shown in FIG. 2, by positioning the inner weld line 52 and the outer weld line 50 closer to the lateral edges of the raised bead seal 26, thereby decreasing the gap distance, the stiffness of the raised bead seal 26 is increased. Accordingly, in high stiffness sections, the outer weld line 50 and the inner weld line 52 may be positioned farther from the lateral edges of the raised bead seal 26 in order to decrease the stiffness of the raised bead seal 26, and in lower stiffness sections, the outer weld line 50 and the inner weld line 52 may be positioned nearer to the lateral edges of the raised bead seal 26 in order to increase the stiffness of the raised bead seal 26. In so doing, the stiffness of the raised bead seal 26 may be controlled along the length of the raised bead seal 26 to be uniform.

Referring to FIG. 3, the raised bead seal 26 forms a generally rectangular shape with rounded corners. The raised bead seal 26, including both the first bead seal 32 in the first plate 28 and the second bead seal 34 in the second plate 30, includes at least one first region 64 extending along the centerline 44, and at least one second region 66 extending along the centerline 44. The first regions 64 are generally associated with regions of the raised bead seal 26 that exhibit lower levels of stiffness. The second regions 66 are generally associated with regions of the raised bead seal 26 that exhibit higher levels of stiffness. As shown in FIG. 3 and as described herein, the first region 64 includes the substantially linear sections of the generally rectangular shaped raised bead seal 26, and the second region 66 includes the generally corner sections of the generally rectangular shaped raised bead seal 26. It should be appreciated that if the endless loop of the raised bead seal 26 is formed to include a shape other than the generally rectangular shape shown in the exemplary embodiment, then the first regions 64 and the second regions 66 may be defined differently that they are described herein.

Referring to FIG. 3, the outer gap distance 54 and the inner gap distance 56 within the first region 64 are substantially equal to a first value, in order to achieve a first stiffness of the raised bead seal 26, including first bead seal 32 and the second bead seal 34. The outer gap distance 54 and the inner gap distance 56 within the second region 66 are substantially equal to a second value, in order to achieve a second stiffness of the raised bead seal 26, including first bead seal 32 and the second bead seal 34. The first value of the gap distance is less than the second value of the gap distance, so that the first stiffness and the second stiffness are approximately equal to each other.

A method of manufacturing the bipolar plate 20 described above is also provided. The method includes forming the first plate 28 to include the first bead seal 32. The first plate 28 may be formed in any suitable manner. For example, the first plate 28 may be formed with a stamping press or other similar device. The first plate 28 is formed so that the first bead seal 32 extends along the centerline 44, and has the first inner lateral edge 36 and the first outer lateral edge 38. The first bead seal 32 may be formed to extend outward away from the plane of the first plate 28, and to define an endless loop defining a generally rectangular shape having at least one corner section and at least one substantially linear section.

The second plate 30 is formed to include the second bead seal 34. The second plate 30 may be formed in any suitable manner. For example, the second plate 30 may be formed with a stamping press or other similar device. The second plate 30 is formed so that the second bead seal 34 extends along the centerline 44, and has the second inner lateral edge 40 and the second outer lateral edge 42. The second bead seal 34 may be formed to extend outward away from the plane of the second plate 30, and to define an endless loop defining a generally rectangular shape having at least one corner section and at least one substantially linear section.

Once the first plate 28 and the second plate 30 are formed to define the first bead seal 32 and the second bead seal 34 respectively, the first plate 28 and the second plate 30 are positioned flat against each other, such that adjacent planar surfaces of the first plate 28 and the second plate 30 are disposed in abutting engagement with each other, and are disposed in parallel to the datum plane 60. The first plate 28 and the second plate 30 are positioned adjacent each other such that the first bead seal 32 and the second bead seal 34 are disposed opposite each other and extend away from each other to form a channel therebetween. The first inner lateral edge 36 and the second inner lateral edge 40 aligned with each other. Similarly, the first outer lateral edge 38 and the second outer lateral edge 42 aligned with each other.

Once the first plate 28 and the second plate 30 are positioned relative to each other, the first plate 28 and the second plate 30 are welded together. The first plate 28 and the second plate 30 may be welded together along the outer weld line 50 and/or the inner weld line 52. As described above, the outer weld line 50 is laterally spaced from the first outer lateral edge 38 and the second outer lateral edge 42 an outer gap distance 54. The outer gap distance 54 varies with a position along the centerline 44 to control the stiffness of the first bead seal 32 and the second bead seal 34. Similarly, the inner weld line 52 is laterally spaced from the first inner lateral edge 36 and the second inner lateral edge 40 an inner gap distance 56. The inner gap distance 56 varies with a position along the centerline 44 to control the stiffness of the first bead seal 32 and the second bead seal 34. In some embodiments, the inner gap distance 56 and the outer gap distance 54 may be substantially equal to each other at any location along the centerline 44. In other embodiments, the inner gap distance 56 and the outer gap distance 54 are substantially different from each other at any location along the centerline 44.

The outer weld line 50 may be positioned nearer to the first outer lateral edge 38 and the second outer lateral edge 42 to decrease the outer gap distance 54, and increase the stiffness of the first bead seal 32 and the second bead seal 34 in the first region 64 of the raised bead seal 26, in order to achieve the first stiffness of the first bead seal 32. As such, the outer weld line 50 may be positioned relative to the first outer lateral edge 38 and the second outer lateral edge 42 to define a first value for the outer gap distance 54 in the first region 64 of the first bead seal 32 to provide the first stiffness.

The outer weld line 50 may be positioned farther from the first outer lateral edge 38 and the second outer lateral edge 42 to increase the outer gap distance 54, and decrease the stiffness of the first bead seal 32 and the second bead seal 34 in the second region 66 of the raised bead seal 26, in order to achieve the second stiffness of the first bead seal 32. As such, the outer weld line 50 may be positioned relative to the first outer lateral edge 38 and the second outer lateral edge 42 to define the second value for the outer gap distance 54 in the second region 66 of the first bead seal 32 to provide the second stiffness. The first value of the outer gap distance 54 may be less than the second value of the outer gap distance 54, so that the first stiffness is substantially equal to the second stiffness.

The inner weld line 52 may be positioned nearer to the first inner lateral edge 36 and the second inner lateral edge 40 to decrease the inner gap distance 56, and increase the stiffness of the first bead seal 32 and the second bead seal 34 in the first region 64 of the raised bead seal 26, in order to achieve the first stiffness of the first bead seal 32. As such, the inner weld line 52 may be positioned relative to the first inner lateral edge 36 and the second inner lateral edge 40 to define a first value for the inner gap distance 56 in the first region 64 of the first bead seal 32 to provide the first stiffness.

The inner weld line 52 may be positioned farther from the first inner lateral edge 36 and the second inner lateral edge 40 to increase the inner gap distance 56, and decrease the stiffness of the first bead seal 32 and the second bead seal 34 in the second region 66 of the raised bead seal 26, in order to achieve the second stiffness of the first bead seal 32. As such, the inner weld line 52 may be positioned relative to the first inner lateral edge 36 and the second inner lateral edge 40 to define the second value for the inner gap distance 56 in the second region 66 of the first bead seal 32 to provide the second stiffness. The first value of the inner gap distance 56 may be less than the second value of the inner gap distance 56, so that the first stiffness is substantially equal to the second stiffness.

The detailed description and the drawings or FIGS. are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A method of manufacturing a bipolar plate for a fuel cell, the method comprising:

forming a first plate to include a first bead seal extending along a centerline and having a first inner lateral edge and a first outer lateral edge;

positioning the first plate against a second plate;

positioning an outer weld line relative to the first outer lateral edge to define a first value for an outer gap distance in a first region of the first bead seal to provide a first stiffness;

positioning the outer weld line relative to the first outer lateral edge to define a second value for the outer gap distance in a second region of the first bead seal to provide a second stiffness;

welding the first plate to the second plate along the outer weld line;

wherein the outer weld line is laterally spaced from the first outer lateral edge the outer gap distance;

wherein the outer gap distance varies with a position along the centerline to establish a variable stiffness of the first bead seal along the centerline;

wherein the first value of the outer gap distance is less than the second value of the outer gap distance; and wherein the first stiffness is equal to the second stiffness.

2. The method set forth in claim 1, wherein forming the first plate to include the first bead seal includes forming the first bead seal to define an endless loop having at least one corner section and at least one linear section, wherein the first region is the at least one linear section of the first bead seal, and the second region is the at least one corner section of the first bead seal.

3. The method set forth in claim 1, further comprising positioning the outer weld line nearer to the first outer lateral edge to decrease the outer gap distance and increase the stiffness of the first bead seal in the first region to achieve the first stiffness of the first bead seal.

4. The method set forth in claim 3, further comprising positioning the outer weld line farther from the first outer lateral edge to increase the outer gap distance and decrease the stiffness of the first bead seal in the second region to achieve the second stiffness of the first bead seal.

5. The method set forth in claim 1, further comprising forming the second plate to include a second bead seal extending along the centerline and having a second inner lateral edge and a second outer lateral edge.

6. The method set forth in claim 5, wherein positioning the first plate against the second plate is further defined as positioning the first plate against the second plate such that the first bead seal and the second bead seal are disposed opposite each other and extend away from each other to form a channel therebetween, with the first inner lateral edge and the second inner lateral edge aligned with each other and the first outer lateral edge and the second outer lateral edge aligned with each other.

7. The method set forth in claim 1, further comprising welding the first plate to the second plate along an inner weld line, wherein the inner weld line is laterally spaced from the first inner lateral edge an inner gap distance, with the inner gap distance varying with movement along the centerline to control the stiffness of the first bead seal.

8. The method set forth in claim 7, wherein the inner gap distance and the outer gap distance are equal to each other at any location along the centerline.

9. A method of manufacturing a bipolar plate for a fuel cell, the method comprising:

forming a first plate to include a first bead seal extending along a centerline and having a first inner lateral edge and a first outer lateral edge;

forming a second plate to include a second bead seal extending along the centerline and having a second inner lateral edge and a second outer lateral edge;

positioning the first plate against the second plate, such that the first bead seal and the second bead seal are disposed opposite each other and extend away from each other to form a channel therebetween, with the first inner lateral edge and the second inner lateral edge aligned with each other and the first outer lateral edge and the second outer lateral edge aligned with each other;

positioning an outer weld line relative to the first outer lateral edge and the second outer lateral edge to define a first value for an outer gap distance in a linear section of the first bead seal to provide a first stiffness;

positioning the outer weld line relative to the first outer lateral edge and the second outer lateral edge to define a second value for the outer gap distance in a corner section of the first bead seal to provide a second stiffness;

welding the first plate to the second plate along the outer weld line;

wherein the outer weld line is laterally spaced from the first outer lateral edge and the second outer lateral edge the outer gap distance;

wherein the outer gap distance varies with a position along the centerline to establish a variable stiffness along the centerline of the first bead seal and the second bead seal respectively;

wherein the first value of the outer gap distance is less than the second value of the outer gap distance; and wherein the first stiffness is equal to the second stiffness.

10. The method set forth in claim 9, further comprising welding the first plate to the second plate along an inner weld line, wherein the inner weld line is laterally spaced from the first inner lateral edge and the second inner lateral edge an inner gap distance, with the inner gap distance varying with movement along the centerline to control the stiffness of the first bead seal and the second bead seal.

* * * * *